US012020863B2

(12) United States Patent
Fauth et al.

(10) Patent No.: US 12,020,863 B2
(45) Date of Patent: Jun. 25, 2024

(54) THIN-FOIL SELF-RESONANT WIRELESS POWER COIL

(71) Applicant: Neuralink Corp., Fremont, CA (US)

(72) Inventors: Lucia Fauth, Menlo Park, CA (US); Joshua S. Hess, Dublin, CA (US)

(73) Assignee: NEURALINK CORP., Fremont, CA (US)

( * ) Notice: Subject to any disclaimer, the term of this patent is extended or adjusted under 35 U.S.C. 154(b) by 261 days.

(21) Appl. No.: 17/513,027

(22) Filed: Oct. 28, 2021

(65) Prior Publication Data

US 2023/0137530 A1 May 4, 2023

(51) Int. Cl.

| | |
|---|---|
| ***H01F 5/02*** | (2006.01) |
| ***H01F 27/28*** | (2006.01) |
| ***H01F 38/14*** | (2006.01) |
| ***H01F 41/061*** | (2016.01) |

(52) U.S. Cl.

CPC ............. *H01F 5/02* (2013.01); *H01F 27/288* (2013.01); *H01F 38/14* (2013.01); *H01F 41/061* (2016.01); *H01F 2005/027* (2013.01)

(58) Field of Classification Search

CPC .......... H01F 5/02; H01F 27/288; H01F 38/14; H01F 41/061; H01F 2005/027; H01F 2027/2857; H01F 27/2847; H01F 27/363; H01F 27/2804

See application file for complete search history.

(56) References Cited

U.S. PATENT DOCUMENTS

| | | | | |
|---|---|---|---|---|
| 5,252,941 A * | 10/1993 | Pitzele | H01F 41/04 | 29/605 |
| 2012/0049991 A1* | 3/2012 | Baarman | H02J 50/005 | 336/199 |
| 2019/0006090 A1* | 1/2019 | Kan | H01F 27/2847 | |

OTHER PUBLICATIONS

Implantable Medical Devices, Resonant Link, Oct. 28, 2021, 5 pages https://www.resonant-link.com/implantable-medical-devices (downloaded Oct. 28, 2021).

* cited by examiner

*Primary Examiner* — Tuyen T Nguyen

(74) *Attorney, Agent, or Firm* — Kilpatrick Townsend & Stockton LLP

(57) ABSTRACT

A coil formed from a flexible polymer substrate that is printed with metal traces is disclosed in which the flexible substrate has notches that align each loop as the substrate is wound into a ring. The notches are precisely spaced so that the diameter of each loop is well controlled. As the substrate is wound, adhesive is applied along its length to fill gaps between each loop's layer. Ideally, the adhesive has a similar dielectric constant as the polymer substrate. The resulting coil has loops of metal traces separated by precise a thickness of dielectric. The precision in spacing between metal layers and dielectric allows the coil to be designed for self-resonance.

11 Claims, 6 Drawing Sheets

THIN-FOIL SELF-RESONANT WIRELESS POWER COIL

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

BACKGROUND

1. Field of the Invention

Embodiments of the present invention generally relate to circuit arrangements or systems for wireless supply or distribution of power, including mechanical details of coils in receiving devices. More specifically, they relate to a flex printed circuit with notch alignment features that allow it to be precisely rolled to control an exact radial spacing between each loop in a resulting coil.

2. Description of the Related Art

Implantable devices should be small and preferably wireless. Their small and compact sizes are so that they minimize physical interference with natural tissue, bone, or movement and so that a surgeon has more leeway in the exact location of the implant. They should be wireless so as eliminate transdermal connections and lessen risk of infection. This applies to both data and power. However, requirements for both small size and wireless power are often at odds with one another.

A preferred way of transmitting power wirelessly, for charging or immediate use, is through the use of coils. Generally, the larger the coil, often the better the efficiency. That is, the more magnetic flux density that goes through each loop of the coil, the more energy is transferred. For small coils within small implants, it can be important to optimize in several aspects in order to make the power transfer efficient.

Commercially available charging coils, such as for wireless charging of smart phones, are often flat disks of substrate upon which a wire trace starts from the center and spirals outward to a final radius. The same techniques for manufacturing a printed circuit board (PCB) are employed to print the wire traces. The techniques allow precise trace widths and spacing. To connect the coils to their electronic circuits, the outermost coil and innermost traces, which are the ends of the continuous trace, are connected to the circuits to form a power receiver.

It is a common design technique to make the electronic circuit formed by the coil and electronics to be resonant at the wireless charging frequency. This maximizes the gain of the receiver and maximizes power transfer efficiency. Often, this is accomplished with a lumped capacitor that is attached to the coil.

In more advanced applications, resonance may be accomplished by the innate capacitance of the coil. That is, because the coil itself is composed of a conductor separated very closely from other conductor, the coil itself acts as a capacitor. This is referred to as a "self-resonant coil." It is more difficult to build a self-resonant coil than tack on a lumped capacitor because the capacitance of the entire coil must be tightly controlled. This means that the manufacturing tolerances with respect to the spacing between traces and dielectric of the coil must be controlled to a high degree.

Others have tackled this problem by stacking planar coils on top of each other and separating them by precisely thin dielectric sheets. However, this configuration may not work in all situations and takes up precious space.

There is a need in the art for more efficient wireless power coils for implants and other small electronic devices.

BRIEF SUMMARY

Generally, a power coil is precisely wound from a flexible substrate into a cylinder by aligning notches along the substrate side when winding. The notches, which are very accurately spaced along the length of the flexible substrate using standard PCB manufacturing techniques for flex cables, control the inward and outward radial distance between each loop. They can be spaced a little bit farther apart for each successive loop so as to compensate for the increased diameter of each loop. A metal shield, which is electrically isolated from the coil, is integrated on the substrate so as to form an enclosing shield around the outer circumference. Because the height of flex substrate is generally not well controlled using standard PCB manufacturing techniques, a cured adhesive fills any gaps between each loop and fixes the radial distance between loops to a precise pitch.

The pitch between the loops can be selected such that the wound coil is self-resonant at its nominal frequency or range of frequencies, or at least close enough that only a tiny lumped capacitor is necessary for fine tuning. This pitch may be made very accurate by slightly increasing the distance between notches along the substrate so that they align between inner loops and outer loops with slightly different diameters.

Some embodiments of the present invention are related to a thin-foil wireless power coil apparatus. The apparatus includes a coil wound from a continuous strip of flexible polymer upon which a metal pattern is printed, the continuous strip including alignment notches along a lateral side that are spaced to align when the coil is wound such that each loop of the coil is a predetermined radial distance from each other. The metal pattern has 1) a section of continuous metal foil with a connection point at each end for receipt of power, and 2) a shield section comprising metal fingers connected with a shield ground electrically isolated from the continuous metal foil section, the shield section enclosing a circumference of the coil. The apparatus includes an adhesive filling gaps between each loop.

A pitch between each loop of the continuous metal foil section can be within ±10 μm of the predetermined radial distance.

The alignment notches can be spaced at increasing distances along the continuous strip of flexible polymer, the increasing distances compensating for larger diameters of successive outer loops. The predetermined radial distance between each loop can be selected such that the wound coil is resonant at a nominal frequency. The nominal frequency can be 6.78 MHz.

The flexible polymer can be polyamide. A thickness of the metal foil can be 18 μm, and a thickness of the polyamide can be 50 μm.

The connection points can include lateral tabs. The shield ground can be exposed through a hole in the flexible polymer. The notches can extend into the metal foil. The metal can be copper, gold, titanium, platinum, or aluminum.

Some embodiments are related to a method of manufacturing a thin-foil wireless power coil. The method can include providing a continuous strip of flexible polymer, printing a metal pattern upon the flexible polymer, wherein the metal pattern includes a section of continuous metal foil with a connection point at each end for receipt of power, and a shield section comprising metal fingers connected with a shield ground electrically isolated from the continuous metal foil section. The method includes cutting notches along a lateral side of the continuous strip, applying adhesive to the continuous strip, winding the continuous strip into a coil such that each notch is aligned with another of the notches, and the shield section encloses a circumference of the coil, and allowing the adhesive to cure.

A pitch between each loop of the continuous metal foil section can be within ±10 μm of a predetermined radial distance.

The method can include fabricating the coil with the configurations and parameters described for the apparatus.

DETAILED DESCRIPTION

A precise coil of insulated conductor can be fabricated by using traditional printed circuit board (PCB) flex cable manufacturing infrastructure. The traditional processes, which are less accurate in depth than in the plane of the PCB, are used to produce a thin strip of flex cable that has physical alignment notches on one side. The thin strip is then wound while aligning the notches and applying adhesive. The aligned notches ensure that each loop of the flex cable is at a certain diameter and distance from the others. The adhesive fills any air gaps between the loops, which can occur when the flex cable is slightly thicker in some areas than others. When the adhesive cures, the end result is a robust coil that has precise (radial) spacing between each successive loop, avoiding accuracy problems in depth of traditional flex PCB manufacturing.

The spacing can be so precise that it enables the wound coil to be designed to be self-resonant. That is, the spacing can be accurate enough—even when the flexible substrate varies in thickness—to accurately tailor the capacitance of the coil. For example, the coil can be tailored to have a nominal frequency of 6.78 MHz, within 1, 2, 3, 4, 5, 7, 10, 15, 20, 30, 40, 50, 60, 70, 80, 90, 100, or 250 kilohertz.

Even if the capacitance is not spot on, it can be close enough but slightly above, such that only a small, discrete multilayer ceramic capacitor (MLCC) may be needed to fine tune to the nominal frequency. The capacitor can be placed so that it is effectively in parallel with the interwinding-capacitance.

PCB flex cable manufacturing is relatively exact in the two dimensions of a flat substrate. Electrical traces can be extremely small and close to one another. Similarly, physical routing or cutting of the sides of the cable is quite accurate. But this accuracy does not extend to depth, at least for flexible substrates.

Flexible substrates are made from somewhat resilient polymers and, by their nature, can vary in thickness. They may vary in thickness due to their initial manufacture, and they may vary in thickness when bent or stretched. This is especially true with polyamides, which have a Poisson ratio of around 0.39 at room temperature.

In having the PCB flex cable manufacturing infrastructure cut alignment notches in the flat substrate, one takes advantage of the precision in the flat x-y plane in order to work around the imprecision in the vertical z plane. When the flat substrate is rolled up, one does not simply tighten it against itself; instead, one aligns the notches—that were precisely cut when in the x-y plane—in order to produce an accurate distance between successive loops. Adhesive fills any voids or other gaps between the loops, forming a constant dielectric with the polyamide between the metal as well as keeping the coil from unwinding.

Figure 1:
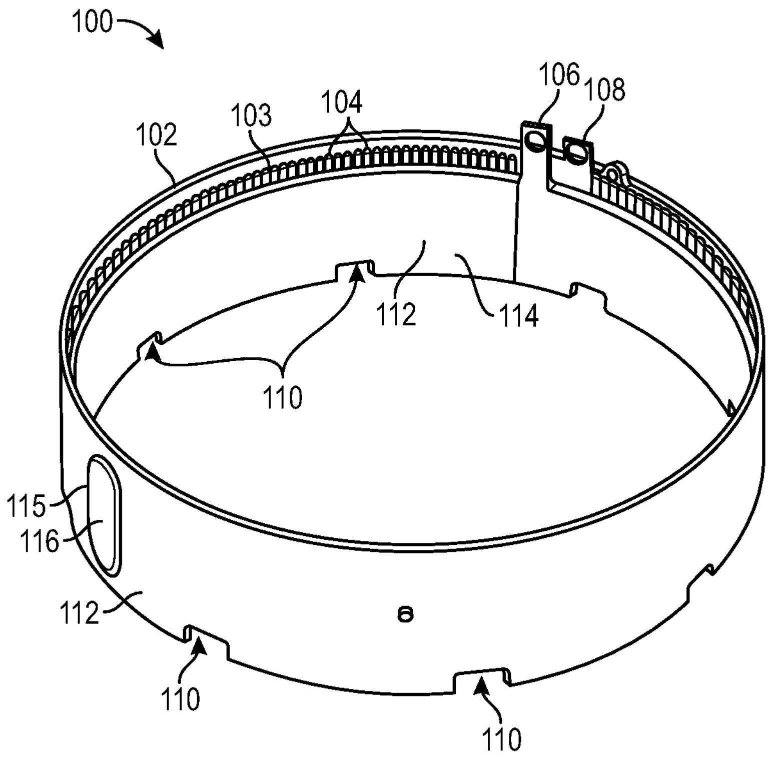
FIG. 1 illustrates a perspective view of a thin-foil wireless power coil apparatus in accordance with an embodiment.

FIG. 1 illustrates a perspective view of thin-foil wireless power coil system 100. Coil 102 is wound from a flat strip of flexible polymer imprinted with a metal pattern having two sections: an antenna section and a shield section. The antenna and shield sections are electrically isolated from one another. Underlying the entire coil, insulative flexible polymer 112 is made from polyamide. It sandwiches metal foil 114 in successive loops, around and around, such that the metal of one loop is insulated from direct contact with the metal from another loop. The connection between the continuous metal foil for the antenna section in the loops is, however, continuous along the circumference.

Continuous metal foil 114 has electrical connection points 106 and 108 at each end. In the preferred embodiment, connection points 106 and 108 project laterally (axially) from the ring-shaped power coil as tabs. They can be connected with a PCB board on which the coil physically lies or that lays on top of the coil. Alternatively, they can be connected by wire or other conductors to their destination. Connection points 106 and 108 are the feed points for the coil antenna and can be connected to the requisite driver, amplifier circuit, or other circuitry for the antenna.

Shield section 103 along the outside includes metal fingers 104, which extend up and down (axially) in the figure. The comb-like fingered metal minimizes large eddy currents in the shield. Metal fingers 104 electrically connect with shield ground 116, a section of which is exposed through hole 115 in flexible polymer 112. Shield ground 116 is not electrically connected with the antenna portion of continuous metal foil 114. Shield section 103 forms the outermost and final loop around the circumference of the rest of the coil, enclosing it.

The metal can include metals suitable for printing on flexible substrates, such as copper, gold, titanium, platinum, or aluminum. Besides metal, any suitable conductor of electricity can be used. For implantable devices, biocompatible metals or conductors are preferred.

Alignment notches 110 are formed on one lateral side of coil 102. They are formed before the coil is wound into a ring and are precisely spaced such that notch 110 from one loop will align with notch 110 from another loop. In this way, each loop or layer of coil 102 is a predetermined (radial) distance from its neighbor. The distance is predetermined to be the proper spacing, given the thickness of the metal foil 114 and presumably similar dielectric constants of the polyamide and adhesive, such that the coil is self-resonant.

In the exemplary embodiment, notches 110 are in the flexible polymer only and do not extend into the metal foil. However, in other embodiments, the notches may extend into the foil. Further, the notches can be place on both sides of the flexible polymer and/or metal, i.e., the top and the bottom of the ring in the figure. In this case, top notches can be exactly across from bottom notches, alternating with them, or offset in any other manner.

Figure 2:
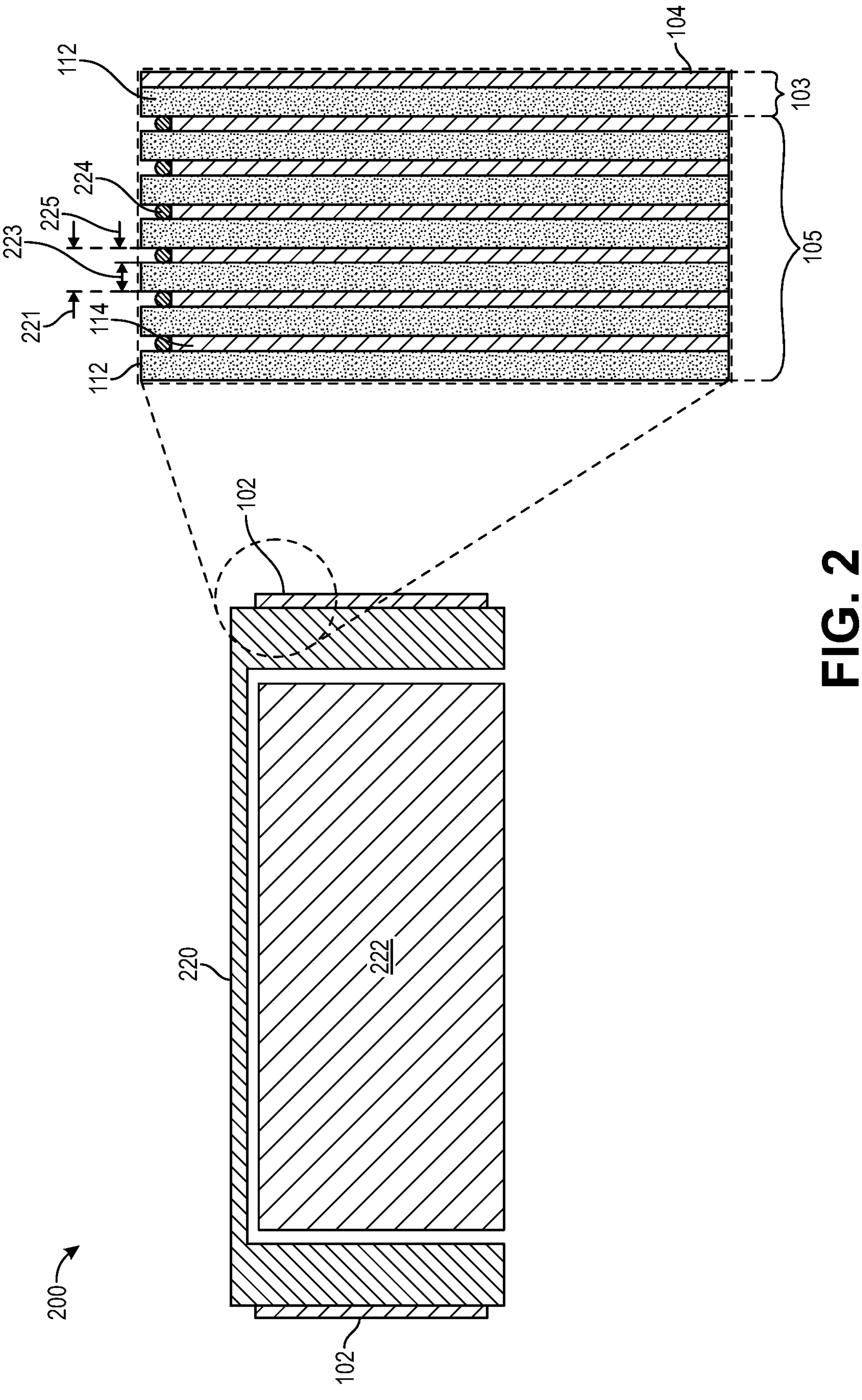
FIG. 2 illustrates a cross-section and close-up cross section of the power coil apparatus of FIG. 1.

FIG. 2 illustrates a cross-section and close-up cross section of the power coil apparatus of FIG. 1. In assembly 200, coil 102 surrounds ferrite cup 220, which covers battery 222. The ferrite guides magnetic field lines through it and protects the battery from heating.

The cross section on the right of the figure shows six alternating layers of flexible polymer 112 and metal foil 114 of antenna section 105. Adhesive 224 is show as beads in the top, but it fills any gaps between the layers, preventing air bubbles therein. It exudes out of the sides where there is no metal on the flexible polymer. Besides filling gaps, the adhesive holds everything in place. It can be selected to have the same or similar dielectric permittivity as the flexible polymer.

Pitch 221 is the average distance between successive layers. Polymer thickness 223 is the thickness of flexible polymer 112, and metal thickness 225 is the thickness of metal foil 114. For example, the thickness of the metal foil can be 18 μm, and the thickness of the polyamide can be 50 μm, plus or minus a few μm, such as ±1, 2, 3, 4, 5, 6, 7, 8, 9, 10, 12, 15, 20, or 25 μm or as otherwise encountered in the art. Pitch 221 is generally polymer thickness 223 plus metal thickness 225 plus thickness of any local adhesive 224 that is between the metal of one layer and the flexible polymer of another layer.

The cross section also shows shield section 103 surrounding antenna section 105. Shield section 103 includes a single layer of flexible polymer 112 and printed metal fingers 104. The layer encloses substantially the entire circumference of the coil in order to shield against electromagnetic interference.

Alternative shields can include more than one layer or wrap around. They can have fingered metal patterns in vertical or horizontal lines, serpentine patterns, non-fingered metal, or other designs commensurate with shielding.

Figure 3:
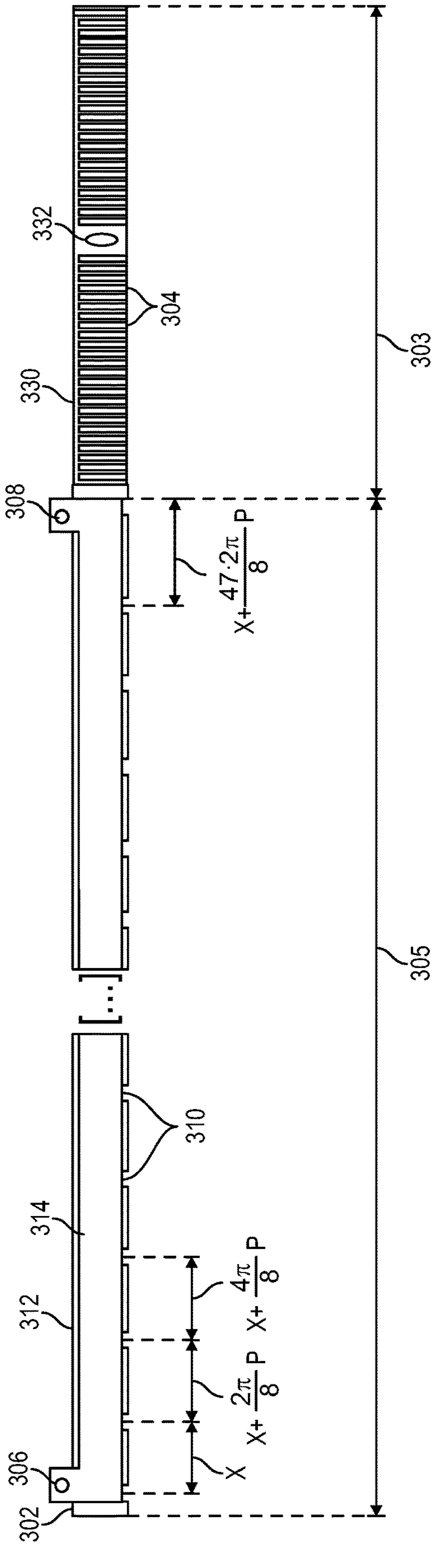
FIG. 3 illustrates a top view of a continuous strip of flexible polymer in accordance with an embodiment.

FIG. 3 illustrates a top view of a flat flexible polymer substrate with a metal printed pattern that has not yet been rolled up. Flat substrate 302 includes antenna section 305 and shield section 303. Antenna section includes flexible polymer 312 and metal foil 314 running longitudinally on the flexible polymer. Connectors 306 and 308 at the ends of metal foil 314 project laterally from metal foil 314.

On the right side of the figure is shield section 303. Shield section 303 includes a pattern of metal fingers 304 connected by a common bus 330. Common bus 330 connects metal fingers 304 with shield ground 332, which has a hole through not only the metal shield but also the underlying flexible substrate.

The design includes eight alignment notches 310 in each loop that the flat flexible polymer substrate will be rolled into. Alignment notches are spaced at increasing distances along the continuous strip of flexible polymer 312 (from left to right in the figure). The increased distances compensate for slightly larger diameters of successive outer loops.

As an example of increasing distances, the first of notches 310 (on the left) will be on the innermost loop. The second notch is spaced a distance 'X' from the first notch. The third notch is spaced $X+2\pi p/8$ from the second notch, where 'p' is the radial distance or pitch between loops. This 'p' is the same as pitch 221 as shown in FIG. 2. Going all around the loop to the ninth notch, which will be aligned with the first notch, the spacing between it and the eighth notch is $X+2\pi p$, which is what is expected because each notch is spaced $X+(n-1)2\pi p/8$ from the previous notch, where n E {1, 2, 3, . . . , 48}. According to this pattern, the spacings of the penultimate and final notches for the six loops with eight notches each are $X+46\cdot 2\pi p/8$ and $X+47\cdot 2\pi p/8$, respectively.

Other embodiments may employ a different number of notches around each loop, which would naturally alter the denominator in the equation.

In some embodiments, the pitch spacing can be the same for all notches along the length of the strip of flexible polymer. But the slight increase in the distance between notches is helpful, even though the pitch is tiny compared to the diameter of the coil, because it allows the distance between each loop to be even more accurate. For example, with standard PCB flex manufacturing, the pitch between each loop of the continuous metal foil section can achieve a tolerance within ±10 μm of a predetermined radial distance, and sometimes±9, 8, 7, 6, 5, 4, 3, 2 or 1 μm of the predetermined tolerance. Of course, larger tolerances, such as ±15, 20, 30, 40, 50, 60, 70, 80, 90, or 100 μm may be achieved and acceptable.

Figure 4:
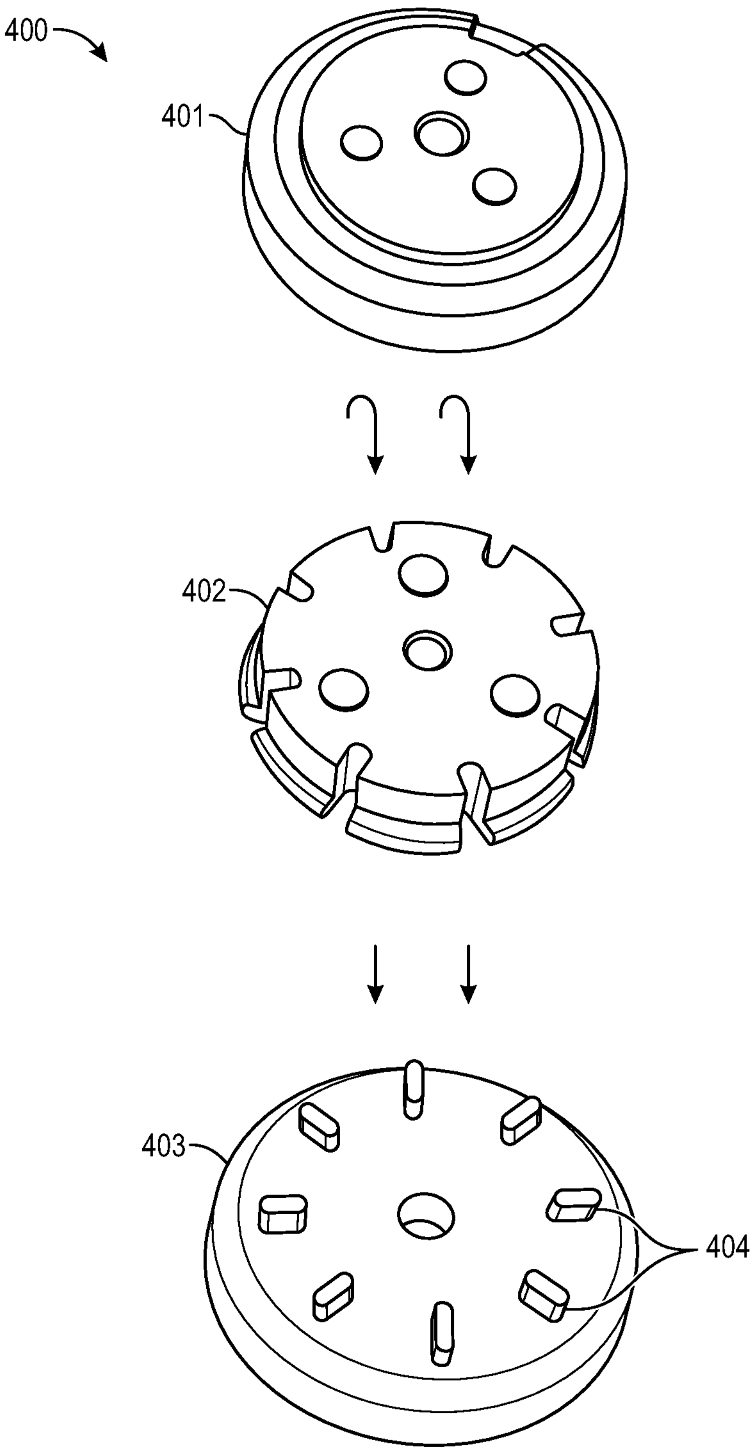
FIG. 4 illustrates an exploded view of a tool for winding the power coil apparatus in accordance with an embodiment.

FIG. 4 illustrates an exploded view of a tool for winding the power coil. Tool 400 is shown in its three constituent parts, top 401, hub 402, and bottom 403. Each is made from polytetrafluoroethylene (PTFE) or nylon so that glue does not adhere well to it. Bottom 403 includes pegs 404 that mate with the alignment notches on one side of the flexible polymer. The three parts are assembled to resemble a yo-yo in that hub 402 has a narrower diameter than top 401 and bottom 403. Small rare earth magnets hold the three parts together.

To start winding, the inner end of the flat flexible polymer (e.g., the left end in FIG. 3) is initially wrapped around hub 402, metal side up. One should be careful to align the notches in pegs 404 appropriately. Unlike wrapping other things, tautness is not necessary, or even preferred, because the notch-to-peg mating is the focus.

Figure 5:
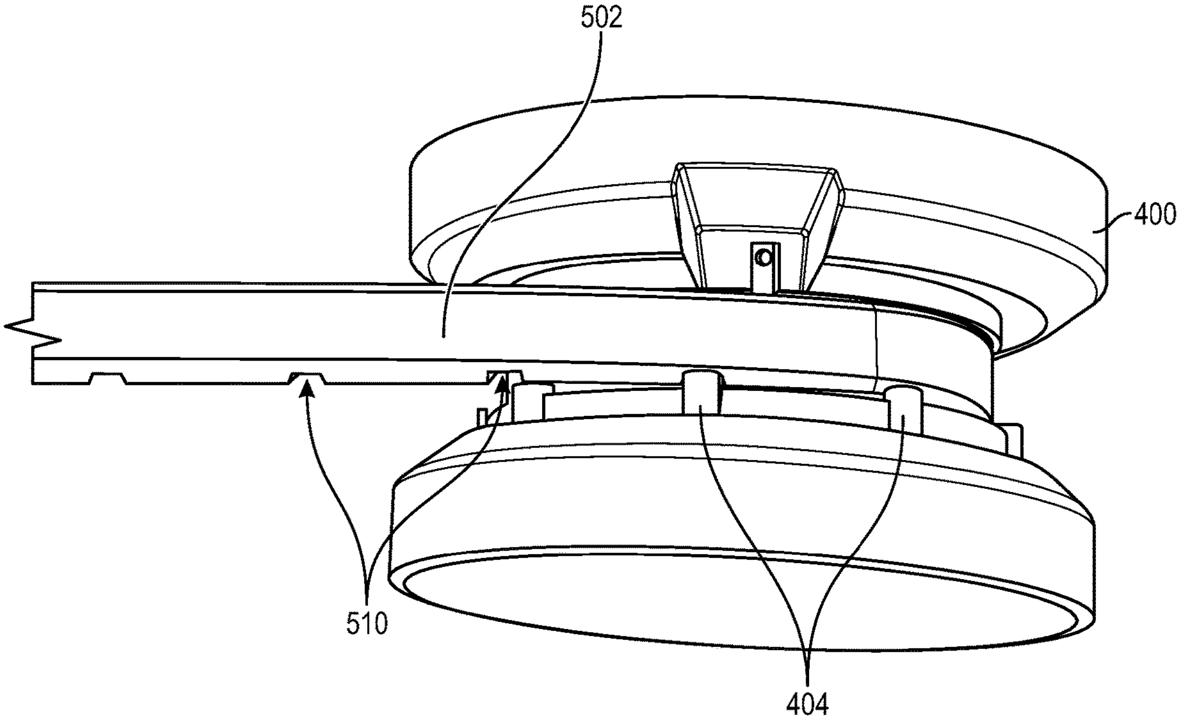
FIG. 5 illustrates a perspective view of the assembled winding tool of FIG. 4 winding a power coil apparatus in accordance with an embodiment.

FIG. 5 illustrates a perspective view of the assembled winding tool of FIG. 4 winding a power coil. Tool 400 is grasped in a hand while the other hand wraps flexible polymer 502 in successive loops, aligning notches 510 with pegs 404, all while applying adhesive.

Adhesive is applied by misting, brushing, or otherwise applying along the substrate. The adhesive fills all voids, and excess oozes from the sides.

The loops are continued all the way until the shield, which wraps a full circumference around the coil. The adhesive is then allowed to cure, hardening the coil such that the loops cannot move with respect to each other.

The hardened coil is removed by prying apart the three parts of the winding tool and pushing the coil off of hub 402 (FIG. 4).

The tool can be mounted so that it is not handheld, and it can be constructed for mechanized assembly, automated adhesive application, and tighter tolerances. The tool may disassemble in the same manner in order to eject the cured coil.

Figure 6:
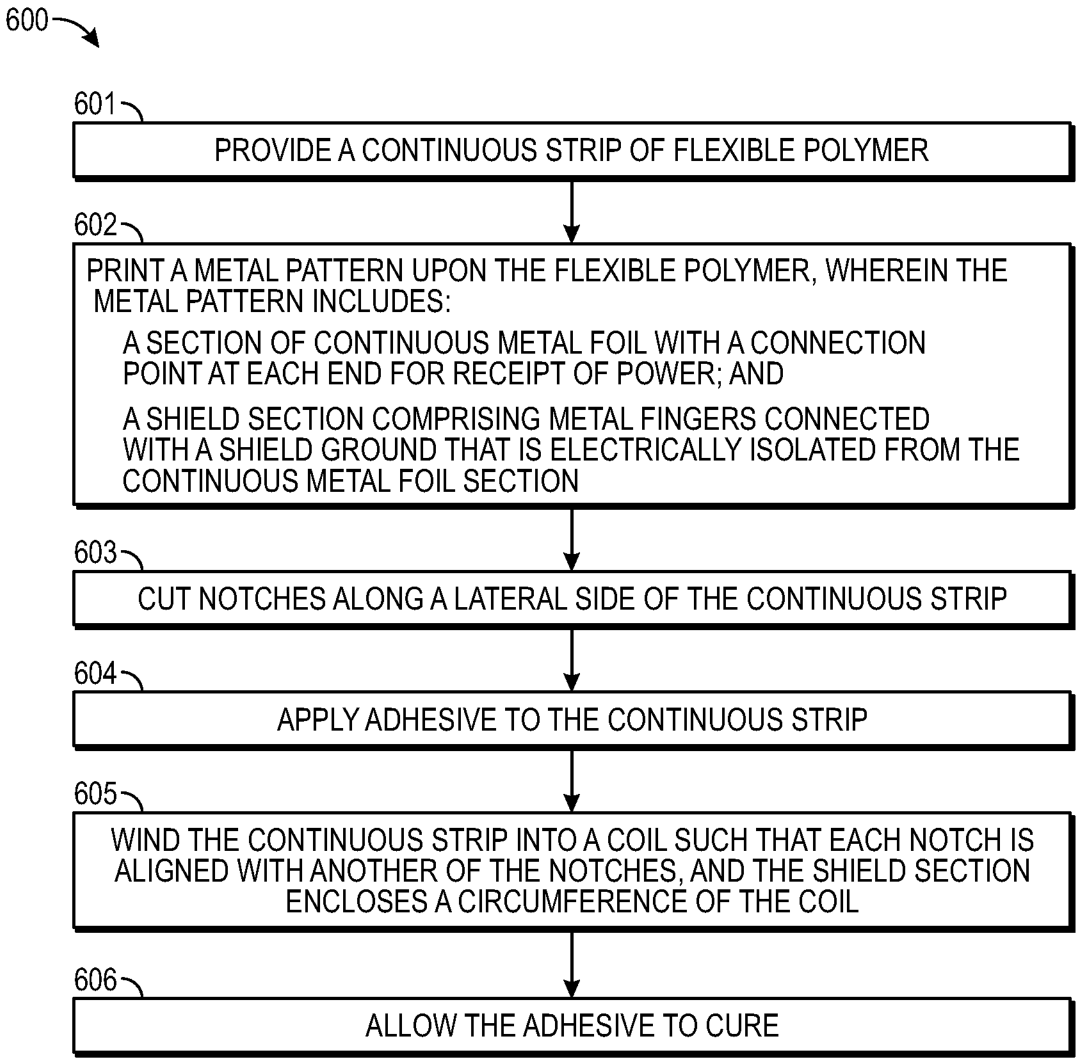
FIG. 6 is a flowchart illustrating an embodiment in accordance with the present invention.

FIG. 6 is a flowchart of a process 600 in accordance with an embodiment. In operation 601, a continuous strip of flexible polymer is provided. In operation 602, a metal pattern is printed upon the flexible polymer, wherein the metal pattern includes: a section of continuous metal foil with a connection point at each end for receipt of power; and a shield section comprising metal fingers connected with a shield ground that is electrically isolated from the continuous metal foil section. In operation 603, notches are cut along at least one lateral side of the continuous strip. In operation 604, adhesive is applied to the continuous strip. In operation 605, the continuous strip is wound into a coil such that each notch is aligned with another of the notches, and the shield section enclosed a circumference of the coil. In operation 606, the adhesive is allowed to cure. If a winding tool is used, the coil workpiece may be removed from the tool.

It should be appreciated that a thin-foil wireless power coil can be connected with electronics that power one or more microprocessors/processing devices that can further be a component of the overall apparatuses. Such processing devices can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C #, Java, Python, Perl, JavaScript, etc.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A thin-foil wireless power coil apparatus comprising:

a coil wound from a continuous strip of flexible polymer upon which a metal pattern is printed, the continuous strip including alignment notches along a lateral side that are spaced to align when the coil is wound such that each loop of the coil is a predetermined radial distance from each other, the metal pattern having:

a section of continuous metal foil with a connection point at each end for receipt of power; and a shield section comprising metal fingers connected with a shield ground electrically isolated from the continuous metal foil section, the shield section enclosing a circumference of the coil; and an adhesive that fills gaps between each loop.

2. The apparatus of claim 1 wherein the alignment notches are spaced at increasing distances along the continuous strip of flexible polymer, the increasing distances compensating for larger diameters of successive outer loops.

3. The apparatus of claim 1 wherein a pitch between each loop of the continuous metal foil section is within ±10 μm of the predetermined radial distance.

4. The apparatus of claim 1 wherein the predetermined radial distance between each loop is selected such that the wound coil is resonant at a nominal frequency.

5. The apparatus of claim 4 wherein the nominal frequency is 6.78 MHz.

6. The apparatus of claim 1 wherein the flexible polymer is polyamide.

7. The apparatus of claim 6 wherein a thickness of the metal foil is 18 μm, and a thickness of the polyamide is 50 μm.

8. The apparatus of claim 1 wherein the connection points include lateral tabs.

9. The apparatus of claim 1 wherein the shield ground is exposed through a hole in the flexible polymer.

10. The apparatus of claim 1 wherein the alignment notches extend into the metal foil.

11. The apparatus of claim 1 wherein the metal foil is copper, gold, titanium, platinum, or aluminum.

* * * * *